United States Patent
Rhee (10) Patent No.: US 6,267,497 B1
(45) Date of Patent: Jul. 31, 2001

(54) DEVICE FOR PRODUCING FEED STUFF OR ORGANIC FERTILIZER FROM EDIBLE WASTE MATERIAL THROUGH LOW TEMPERATURE, NATURAL FERMENTATION AND DRYING PROCESS

(76) Inventor: Myng-Sup Rhee, 604Ho, Samik Apt. 403 Dong, 708 Sooseo-Dong, Kangnam-Ku, Seoul (KR)

(*) Notice: Subject to any disclaimer, the term of this patent is extended or adjusted under 35 U.S.C. 154(b) by 0 days.

(21) Appl. No.: 09/130,298

(22) Filed: Aug. 6, 1998

(30) Foreign Application Priority Data

Apr. 22, 1998 (KR) .................................................. 98-14358

(51) Int. Cl.⁷ .................................................. B01F 7/08
(52) U.S. Cl. .................. 366/186; 366/147; 366/300; 366/321; 366/603; 241/260.1
(58) Field of Search .................. 366/64, 66, 96, 366/97, 102, 103, 292, 186, 297–301, 318, 341, 603, 147, 321; 241/101.5, 101.6, 101.8, 186.5, 236, 260.1

(56) References Cited

U.S. PATENT DOCUMENTS

| | | | |
|---|---|---|---|
| 4,040,571 | * | 8/1977 | Lindeborg . |
| 4,310,252 | * | 1/1982 | Ryan ..................................... 366/300 |
| 4,432,499 | * | 2/1984 | Henkensiefken et al. ........... 366/603 |
| 4,577,805 | * | 3/1986 | Seymour ............................... 366/603 |
| 4,896,970 | * | 1/1990 | Schuler ............................. 241/260.1 |
| 4,951,883 | * | 8/1990 | Loppoli et al. . |
| 5,005,980 | * | 4/1991 | Zimmerman ........................ 366/297 |
| 5,148,999 | * | 9/1992 | Curfman et al. . |
| 5,240,321 | * | 8/1993 | Miller . |
| 5,340,214 | * | 8/1994 | Juzwiak ............................... 366/292 |
| 5,351,899 | * | 10/1994 | Koenig . |
| 5,375,925 | * | 12/1994 | Elkin ...................................... 366/64 |
| 5,630,944 | * | 5/1997 | Terblanche .......................... 366/298 |
| 5,984,218 | * | 11/1999 | Peat . |

FOREIGN PATENT DOCUMENTS

| | | |
|---|---|---|
| 93-1480 | 3/1993 | (KR) . |
| 94-9484 | 10/1994 | (KR) . |
| 96-4473 | 4/1996 | (KR) . |

\* cited by examiner

*Primary Examiner*—Charles E. Cooley
(74) *Attorney, Agent, or Firm*—Nawrocki, Rooney & Sivertson, P.A.

(57) ABSTRACT

A method and device for producing feed stuff or organic fertilizer from edible waste material, such as domestic and commercial food waste products in addition to marine, livestock and agriculture by-products resulting from the commercial production of food items, through a low temperature, natural fermentation and drying process is disclosed. In an embodiment, two mixing/crushing screw feeder units are inclinedly arranged within a chamber with the inclining directions of the two units being opposite to each other. Two mixing screw feeder units individually and downwardly extend from the overlapping inclined end of one of the two mixing/crushing units to the underlapping declined end of the other mixing/crushing unit. In another embodiment, two oppositely rotatable screw feeders, individually consisting of a drive shaft with two helical screws rotating upon the shaft in opposite directions, are horizontally arranged in the chamber.

2 Claims, 7 Drawing Sheets

DEVICE FOR PRODUCING FEED STUFF OR ORGANIC FERTILIZER FROM EDIBLE WASTE MATERIAL THROUGH LOW TEMPERATURE, NATURAL FERMENTATION AND DRYING PROCESS

BACKGROUND OF THE INVENTION

1. Field of the Invention

The present invention relates, in general, to a disposal of edible waste material consisting of domestic and commercial food waste products in addition to marine, livestock and agriculture by-products resulting from the commercial production of food items and, more particularly, to a method and device for producing feed stuff or organic fertilizer from such waste material by naturally fermenting and drying the material at low temperatures while uniformly mixing and crushing such material.

2. Description of the Prior Art

In accordance with the elevation in the standard of living, the amount of edible waste material, such as domestic and commercial food waste products in addition to marine, livestock and agriculture by-products resulting from the commercial production of food items, rapidly increases, so that an issue arises concerning the disposal of such waste material.

In an effort to effectively treat such waste material, several types of devices, used for producing feed stuff or organic fertilizer from such waste material through a fermentation and drying process, are proposed as disclosed in Korean Patent Publication Nos. 93-1480, 94-9484 and 96-4473.

In the above Korean devices, a fermenting/drying chamber is vertically, horizontally or inclinedly positioned with a drive shaft being axially and rotatably set in the chamber. An agitating blade or helical screw is provided on the drive shaft, thus stirring, mixing and crushing edible waste material while moving the material within the chamber, thus producing feed stuff or organic fertilizer from edible waste material.

However, such a typical device, with the agitating blade or helical screw, is problematic in that the device only partially loads waste material on a part in the chamber due to a structural limit of the agitating blade or the helical screw. Therefore, it is impossible for the device to uniformly or effectively stir or mix the waste material. In order to overcome such a problem, the helical screw may be designed for rotating upon the drive shaft in opposite directions and having different diameters. The helical screw, with opposite spiral directions and different diameters, somewhat effectively mixes edible waste material while moving the material in opposite directions. However, such a helical screw, with opposite spiral directions and different diameters, also fails to uniformly mix or crush waste material since the material is heavy and bulky, thus sinking under its own weight.

Due to such a nonuniformity in mixing and crushing the edible waste material in the chamber, the typical device fails to completely ferment or dry the waste material into feed stuff or organic fertilizer and reduces the quality of resulting feed stuff or organic fertilizer. It is extremely impractical to provide animals with such a low quality feed stuff or organic fertilizer.

Another problem experienced in the above devices resides in that the agitating blade or helical screw in the chamber is partially overloaded with heavy and bulky material and this results in exceeding consumption of electric power and shortens the expected life span of these devices.

SUMMARY OF THE INVENTION

Accordingly, the present invention has been made keeping in mind the above problems occurring in the prior art, and an object of the present invention is to provide a method and device for producing feed stuff or organic fertilizer from edible waste material by naturally fermenting, drying and sterilizing the material at low temperatures while uniformly and effectively mixing and crushing the material in a chamber.

Another object of the present invention is to provide a method and device for producing feed stuff or organic fertilizer from edible waste material through a low temperature, natural fermentation and drying process suitable for almost completely fermenting and drying the material into high quality feed stuff or organic fertilizer.

A further object of the present invention is to provide a device for producing feed stuff or organic fertilizer from edible waste material through a low temperature, natural fermentation and drying process, which effectively mixes and crushes the material while uniformly loading the heavy and bulky material on a mixing/crushing means, thereby being effectively used for a lengthy period of time while being economical in the consumption of electricity.

In order to accomplish the above object, the primary embodiment of the present invention provides a method of producing feed stuff or organic fertilizer from edible waste material, consisting of domestic and commercial food waste products in addition to marine, livestock and agriculture by-products resulting from the commercial production of food items, through a low temperature, natural fermentation and drying process in a fermenting/drying chamber, comprising the steps of: moving the waste material upwardly along an inclinedly arranged first screw feeder unit from a declined end to an inclined end of the unit while mixing and crushing the material by helical screws of the unit prior to passing the material to an inclined end of an inclinedly arranged second screw feeder unit; moving the waste material downwardly along the second unit from the inclined end to a declined end of the second unit while mixing the material by helical screws of the second unit prior to passing the material to a declined end of an inclinedly arranged third screw feeder unit; moving the waste material upwardly along the third unit from the declined end to an inclined end of the third unit while mixing and crushing the waste material by helical screws of the third unit prior to passing the material to an inclined end of an inclinedly arranged fourth screw feeder unit; moving the waste material downwardly along the fourth unit from the inclined end to a declined end of the fourth unit while mixing the material by helical screws of the fourth unit prior to passing the material to the declined end of the first unit, thus allowing the waste material to be repeatedly processed by the first to fourth units until the material is appropriately fermented and dried into feed stuff or organic fertilizer.

In the above method, the first and third screw feeder units individually consist of alternately and parallely arranged first and second screw feeders rotatable in opposite directions, thus moving the waste material upwardly while mixing and crushing the material.

In accordance with another embodiment of this invention, the method comprises the step of: repeatedly moving the waste material along two horizontally and parallely arranged screw feeders outwardly and inwardly while mixing and crushing the material by helical screws of the two screw feeders rotated in opposite directions.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
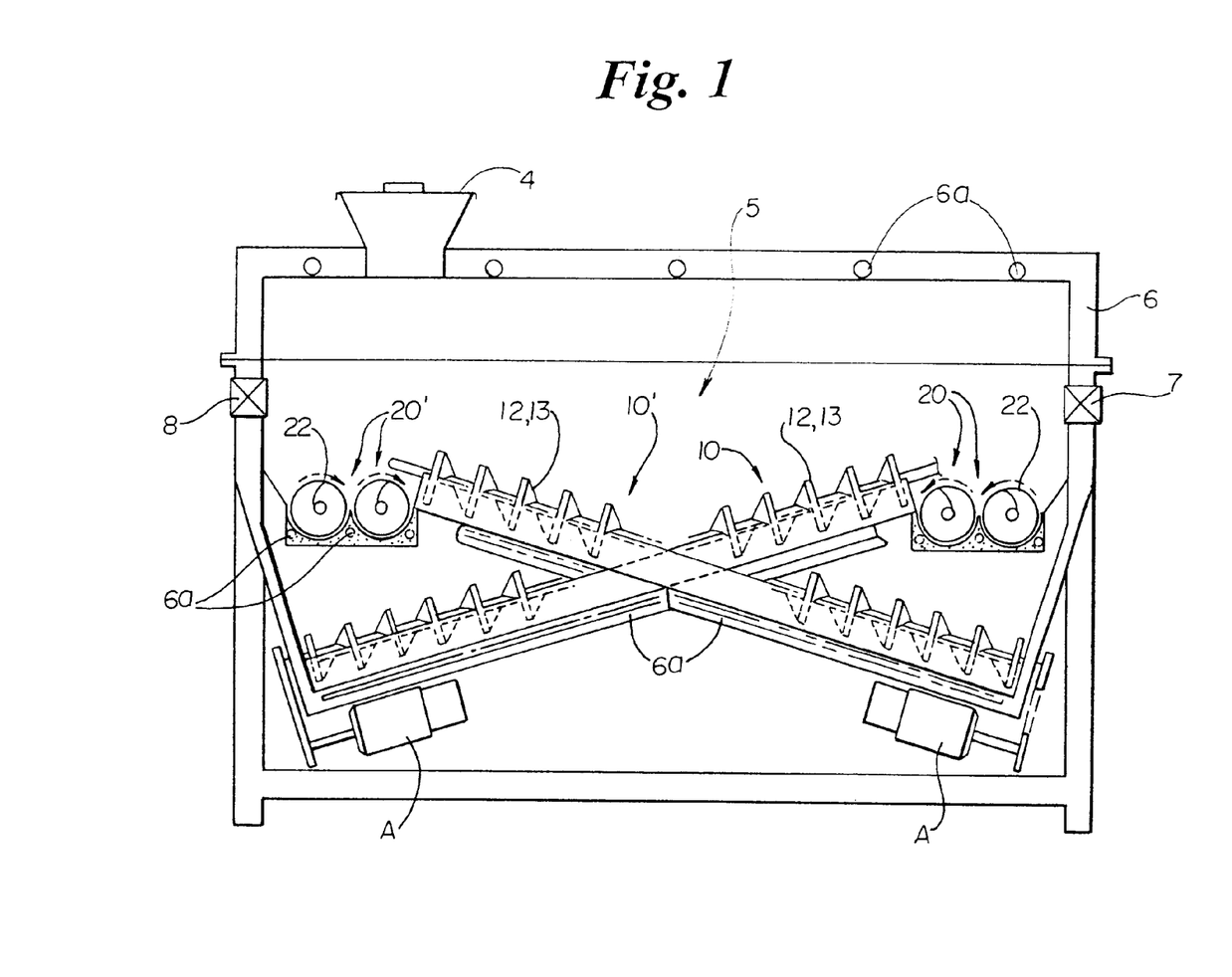
FIG. 1 is a longitudinal sectioned view of a device in accordance with the primary embodiment of the present invention.
Figure 2:
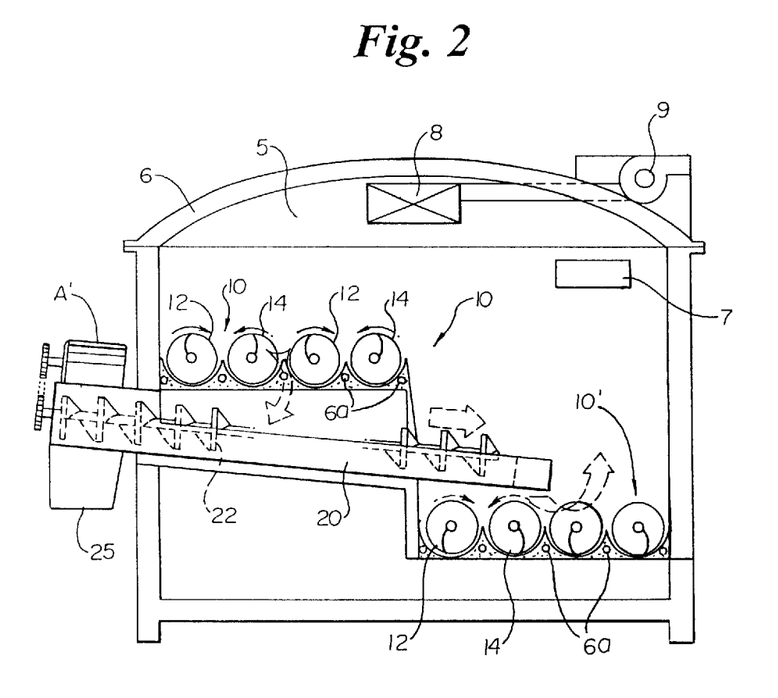
FIG. 2 is a cross sectioned view of the device of FIG. 1.

FIGS. 1 and 2 are sectional views of a device, which produces high quality feed stuff or organic fertilizer from edible waste material by naturally fermenting and drying the material at low temperatures, in accordance with the primary embodiment of the present invention.

The device of FIGS. 1 and 2 ferments and dries waste material, consisting of domestic and commercial food waste products in addition to marine, livestock and agriculture by-products resulting from the commercial production of food items, into feed stuff or organic fertilizer as follows.

Prior to starting the device, waste material is introduced into a fermenting/drying chamber 5 through a waste material entrance 4.

When assuming that the waste material is primarily mixed and crushed at the underlapping declined end of a first screw feeder unit 10 inside the chamber 5, the material moves upwardly along the first unit 10 to the overlapping inclined end of that unit 10 while being mixed and crushed by the unit 10. At the overlapping inclined end of the first unit 10, the material is dropped onto the underlapping inclined end of a second screw feeder unit 20.

In the first unit 10, a plurality of, for example, a pair of first and a pair of second screw feeders 12 and 14 are arranged in parallel to each other. The above screw feeders 12 and 14 are rotatable in opposite directions, thus effectively mixing and crushing the material while moving it.

The waste material, thereafter, moves downwardly along the second unit 20 to the overlapping declined end of the unit 20 while being mixed. At the declined end of the unit 20, the material is dropped onto the underlapping declined end of a third screw feeder unit 10'.

Thereafter, the material moves upwardly along the third unit 10' to the overlapping inclined end of that unit 10' while being mixed and crushed. At the inclined end of the unit 10', the material is dropped onto the underlapping inclined end of a fourth screw feeder unit 20'.

In the same manner as that described for the first unit 10, a plurality of, for example, a pair of first and a pair of second screw feeders 12 and 14 are arranged in the third unit 10' and are rotatable in opposite directions, so that the third unit 10' effectively mixes and crushes the waste material while moving it.

The waste material, thereafter, moves downwardly along the fourth unit 20' to the overlapping declined end of that unit 20' while being mixed prior to being dropped onto the underlapping declined end of the first unit 10. Upon receiving the waste material, the first unit 10 moves the material upwardly while mixing and crushing it, thus starting another cycle of mixing and crushing the waste material. Such a cycle is repeated until the material is appropriately and almost completely fermented and dried into feed stuff or organic fertilizer.

In the device, the first and third units 10 and 10' are for both mixing and crushing the waste material, while the second and fourth units 20 and 20' are for only mixing the waste material.

The construction of the above device will be described in detail with reference to the accompanying drawings.

As shown in FIGS. 1 to 4b showing the device according to the primary embodiment of this invention, the device has a fermenting/drying chamber 5 where waste material is repeatedly fermented and dried into feed stuff or organic fertilizer.

In the chamber 5, two mixing/crushing units: first and third screw feeder units 10 and 10' individually consisting of four screw feeders, are oppositely and inclinedly arranged with the inclining directions of the two units 10 and 10' being diametrically opposite to each other, thus forming an X-shaped profile viewed from the front as shown in FIG. 1. Of the four screw feeders of each unit 10 or 10', two are called first screw feeders 12, while the other two are called second screw feeders 14. The first and second screw feeders 12 and 14 are alternately and parallely arranged and are designed for being rotatable in opposite directions. For ease of description, of the two first screw feeders 12, one positioned at the outside is called an outside first screw feeder, while the other positioned at the inside is called an inside first screw feeder. The two second screw feeders 14 are respectively called inside and outside screw feeders in the same manner as that described for the first screw feeders 12. Each of the two units 10 and 10' moves waste material upwardly from the underlapping declined end to the overlapping inclined end while mixing and crushing the material.

Two mixing units: second and fourth screw feeder units 20 and 20' individually consisting of two parallel screw feeders 22, are oppositely and inclinedly arranged in the chamber 5. In such a case, the second unit 20 extends downwardly from the overlapping inclined end of the first unit 10 to the underlapping declined end of the third unit 10', while the fourth unit 20' extends downwardly from the overlapping inclined end of the third unit 10' to the underlapping declined end of the first unit 10.

It should be noted that in the description of all overlapping and underlapping ends, whether inclined or declined, the overlapping and underlapping ends are spaced apart by a certain distance. That is, they do not come into contact with each other.

Figure 4A:
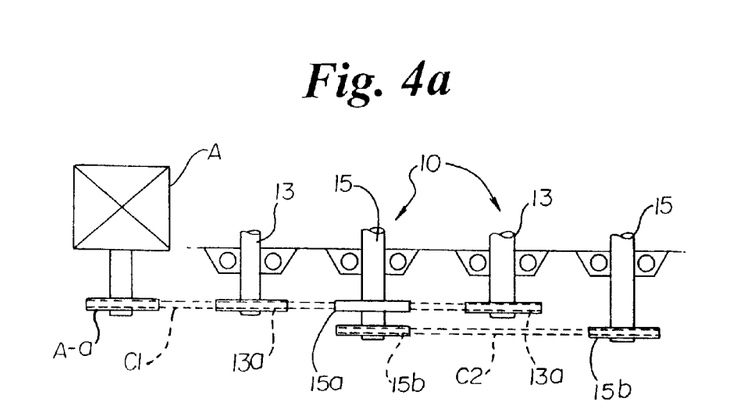
FIGS. 4a and 4b are views showing the construction and operation of a power transmission unit for each mixing/crushing unit included in the device of FIG. 1.
Figure 4B:
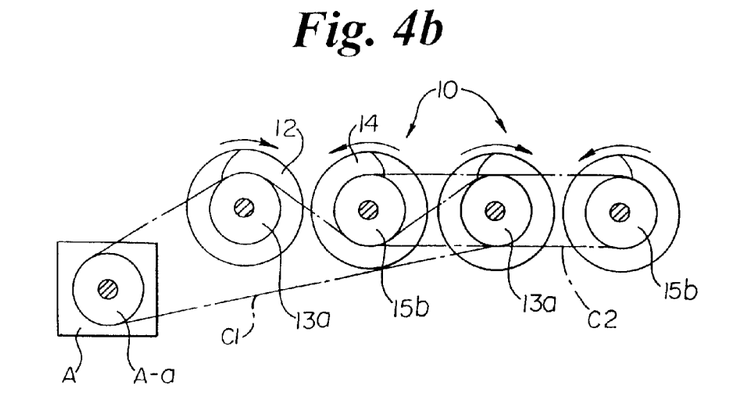

In the above device, the four screw feeders 12 and 14 of each mixing/crushing unit 10, 10' are commonly operated by the rotating force of a first drive means (A), such as a motor. The rotating force of the first drive means (A) is transmitted to the four screw feeders 12 and 14 through a first power transmission unit of FIGS. 4a and 4b. As shown in FIGS. 4a and 4b, the first power transmission unit for each mixing/ crushing unit 10, 10' comprises one middle sprocket 15a and a plurality of end sprockets 13a and 15b. That is, the end 13 of each first screw feeder 12 has a first end sprocket 13a, while the end 15 of each second screw feeder 14 has a second end sprocket 15b. The middle sprocket 15a is fixed to the inside second screw feeder 14 at a position inside the second end sprocket 15b of the screw feeder 14. The two end sprockets 13a of the first screw feeders 12 are commonly connected to a drive sprocket (A-a) of the first drive means (A) through a first chain C1 so as to rotate the first screw feeders 12 in the same direction. In order to allow the inside second screw feeder 14 to be rotatable in a direction reversed to that of the first screw feeders 12, the first chain C1 also engages with the middle sprocket 15a of the inside second screw feeder 14 prior to being wrapped around the end sprocket 13a of the inside first screw feeder 12. The two end sprockets 15b of the second screw feeders 14 are connected to each other through a second chain C2 so as to rotate the second screw feeders 14 in the same direction.

Figure 3:
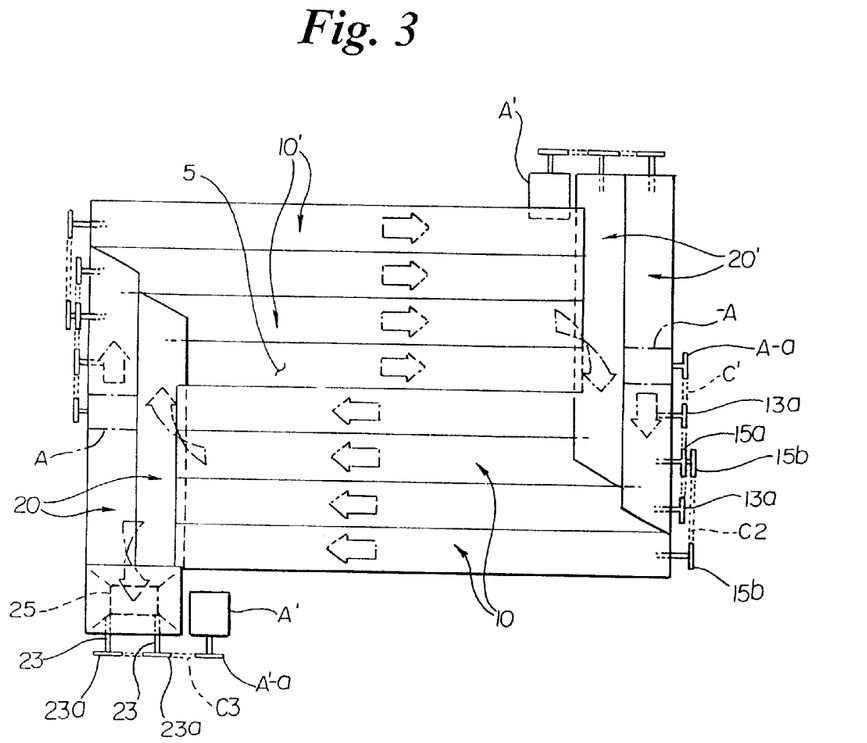
FIG. 3 is a plan view showing the operation of the device of FIG. 1 when the device mixes and crushes waste material.

On the other hand, the two screw feeders 22 of each mixing unit 20, 20' are operated by the rotating force of a second drive means (A'), such as a motor. The rotating force of the second drive means (A') is transmitted to the screw feeders 22 through a second power transmission unit. As shown in FIG. 3, the second power transmission unit for each of the mixing units 20 and 20' comprises two end sprockets 23a which are respectively fixed to the ends 23 of the two screw feeders 22. The two end sprockets 23a of the screw feeders 22 are commonly connected to a drive sprocket (A'-a) of the second drive means (A') through a third chain C3 so as to rotate the two screw feeders 22 in the same direction.

In the primary embodiment of this invention, each power transmission unit, used for transmitting the rotating force of each drive means A or A' to an associated screw feeder unit 10, 10', 20 or 20', forms a chain transmission system. However, it should be understood that another type of conventional power transmission system, such as a belt or gear transmission system, may be used in place of the chain transmission system without affecting the functioning of this invention.

Either of the two mixing units 20 and 20' extends to an exit 25 of the fermenting/drying chamber 5, thus selectively discharging the feed stuff or organic fertilizer to the outside of the chamber 5 through the exit 25. In the primary embodiment of FIG. 3, the second unit 20 extends to the exit 25, so that the unit 20 selectively discharges the processed material or the feed stuff or organic fertilizer from the chamber 5 through the exit 25. When it is necessary to discharge the processed material from the chamber 5, the drive means (A') for the second unit 20 is rotated in a reversed direction, so that the two screw feeders 22 of the unit 20 are rotated in a reversed direction, thus discharging the processed material from the chamber 5.

An insulating material 6 covers both the bottom of the four units 10, 10', 20 and 20' and the housing of the chamber 5 as shown in FIGS. 1 and 2, thus thermally insulating the chamber 5 from the atmosphere. A heating pipe 6a is arrayed in the insulating material 6, thus allowing hot air from a hot air source (not shown) to circulate throughout the heating material 6.

In the drawings, the reference numerals 7 and 8 denote an air intake port and an air suction port for the chamber 5, respectively.

The operational effect of the above device will be described hereinbelow.

In order to produce feed stuff or organic fertilizer from edible waste material using the device of this invention, an appropriate amount of edible waste material, consisting of domestic and commercial food waste products in addition to marine, livestock and agriculture by-products resulting from the commercial production of food items, is introduced into the fermenting/drying chamber 5 through the entrance 4.

Thereafter, a blower fan 9 is activated, so that air forcibly circulates inside the chamber 5 in a direction from the air intake port 7 to the air suction port 8.

In addition, the hot air source is activated in order to increase the temperature of the chamber 5. That is, when the hot air source is activated, hot air from the source circulates through the heating pipe 6a, thus increasing the temperature inside the chamber 5 to a level suitable for naturally fermenting and drying the waste material within the chamber 5.

Thereafter, the first and second drive means A and A' for the four units 10, 10', 20 and 20' are activated, so that the units 10, 10', 20 and 20' is operated as will be described hereinbelow.

For ease of description, the operation of the screw feeder units 10, 10', 20 and 20' is described with the waste material being primarily mixed and crushed at the underlapping declined end of the first unit 10.

The first and second screw feeders 12 and 14 of the first unit 10 are rotated in opposite directions by the first drive means (A). That is, the screw feeders 12 and 14 are rotated clockwise and counterclockwise respectively as shown in FIG. 2, so that the waste material moves upwardly along the first unit 10 from the declined end to the inclined end of the unit 10 while being mixed and crushed by the helical screws of that unit 10.

The waste material is, thereafter, dropped onto the underlapping inclined end of the second unit 20 and moves downwardly along the unit 20 to the overlapping declined end of that unit 20 while being mixed by the helical screws of that unit 20. In such a case, the two screw feeders 22 of the unit 20 are rotated in a normal direction. The waste material is dropped from the second unit 20 onto the underlapping declined end of the third unit 10'.

The waste material moves upwardly along the third unit 10' to the overlapping inclined end of that unit 10' while being mixed and crushed with the first and second screw feeders 12 and 14 of that unit 10' being rotated in opposite directions. The waste material is, thereafter, dropped onto the underlapping declined end of the fourth unit 20'. The waste material moves downwardly along the fourth unit 20' to the overlapping declined end of that unit 20' prior to being dropped onto the declined end of the first unit 10.

During the operation of the device, the first and second screw feeders 12 and 14 of the first unit 10 are rotated in opposite directions as described above. Edible waste material thus comes into frictional contact with the screw feeders 12 and 14, thereby generating low temperature heat. Such low temperature heat not only forms a desirable condition suitable for naturally fermenting and drying the waste material, but also sterilizes the material.

In addition, the waste material is effectively and uniformly mixed and crushed by the first to fourth units 10, 10', 20 and 20', so that the natural fermentation and drying effect of the device is not partially affected on the waste material, but is uniformly affected on all the waste material.

When the waste material is completely processed into feed stuff or organic fertilizer by the device, the feed stuff or organic fertilizer is discharged to the outside of the chamber 5 through the exit 25. When it is necessary to discharge the feed stuff or organic fertilizer from the chamber 5, the exit 25 is opened prior to starting the drive means (A') for the second unit 20 in a reversed direction. The two screw feeders 22 of the second unit 20 are thus rotated in the reversed direction and discharge the feed stuff or organic fertilizer from the chamber 5 into a feed stuff or organic fertilizer container (not shown) outside the chamber 5 through the exit 25.

Figure 5:
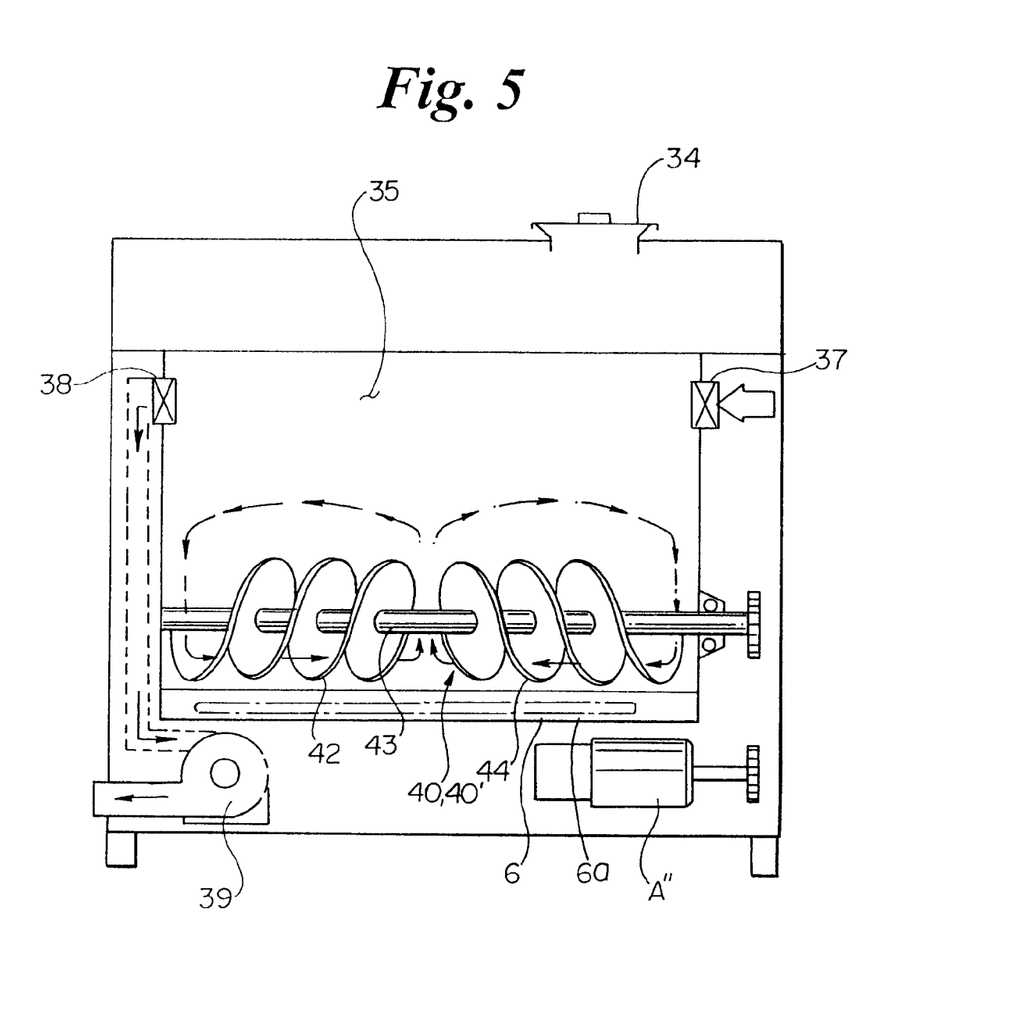
FIG. 5 is a longitudinal sectioned view of a device in accordance with the second embodiment of the present invention.
Figure 6A:
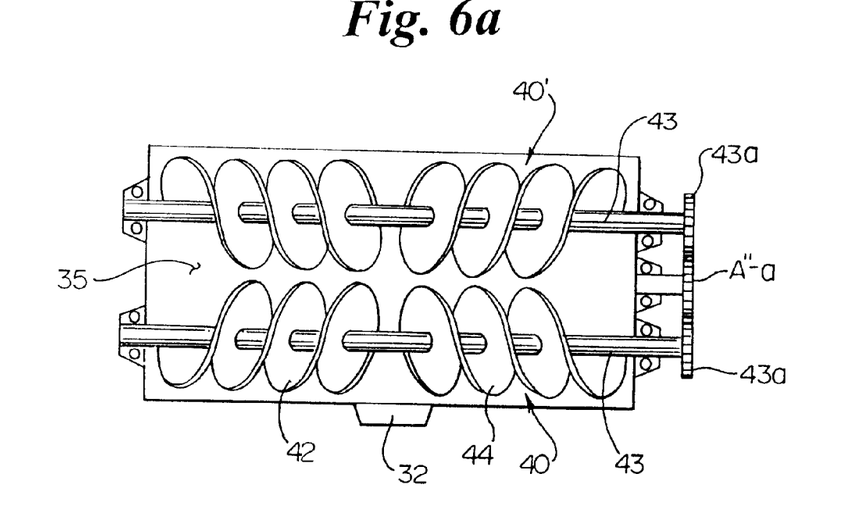
FIGS. 6a and 6b are views showing the construction and operation of a mixing/crushing unit installed in the device of FIG. 5, the unit consisting of two mixing/crushing screw feeders in accordance with an embodiment of this invention.
Figure 6B:
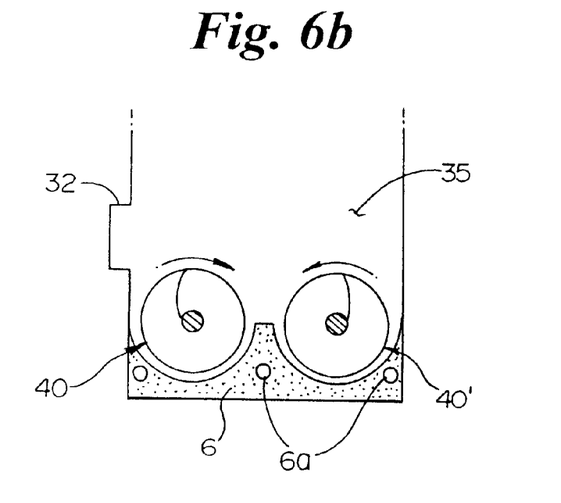

FIGS. 5 to 6b are views of a device for naturally fermenting and drying edible waste material into feed stuff or organic fertilizer at low temperatures in accordance with the second embodiment of the present invention.

The device according to the second embodiment ferments and dries edible waste material into feed stuff or organic fertilizer as follows.

Prior to starting the device, edible waste material, such as domestic and commercial food waste products in addition to marine, livestock and agriculture by-products resulting from the commercial production of food items, is introduced into a fermenting/drying chamber 35 of the device through an entrance 34.

When assuming that the waste material is primarily mixed and crushed at both ends of first and second screw feeders 40 and 40' inside the chamber 35, the waste material moves along the two screw feeders 40 and 40' from the outside to the center while being mixed and crushed by the helical screws of the two feeders 40 and 40'.

Thereafter, the waste material moves along the two screw feeders 40 and 40' from the center to the outside while being mixed and crushed by the helical screws of the feeders 40 and 40'. Such an opposite directional movement of the waste material along the screw feeders 40 and 40' is repeated until the waste material is appropriately fermented and dried into feed stuff or organic fertilizer.

In such a case, the two screw feeders 40 and 40' are rotated in opposite directions, thus effectively mixing and crushing the waste material while moving it. Therefore, the above device naturally ferments and dries the waste material at low temperatures, thus producing high quality feed stuff or organic fertilizer.

The construction of the above device will be described in detail with reference to FIGS. 5 to 6b.

As shown in the drawings, the device has a fermenting/drying chamber 35 where edible waste material is fermented and dried into feed stuff or organic fertilizer.

First and second screw feeders 40 and 40' are horizontally and parallely arranged inside the chamber 35. The two screw feeders 40 and 40' individually comprise a drive shaft 43 with two helical screws 42 and 44 rotating upon the drive shaft 43 in opposite directions at both sides of the shaft 43. In addition, the rotating direction of the helical screws 42 and 44 upon the drive shaft of the first screw feeder 40 is opposite to that of the second screw feeder 40'. The above screw feeders 40 and 40' are also designed for being rotated in opposite directions.

The two screw feeders 40 and 40' are operated by the rotating force of a drive means (A"), such as a motor. The rotating force of the drive means (A") is transmitted to the two screw feeders 40 and 40' through a third power transmission unit of FIG. 6a. As shown in FIG. 6a, the third power transmission unit for the two screw feeders 40 and 40'comprises two gears 43a each of which is fixed to the end 43 of each screw feeder 40 or 40'. The two gears 43a commonly engage with a drive gear (A"-a) of the drive means (A") at both sides of the gear (A"-a), thus being rotatable in opposite directions.

In the second embodiment, the power transmission unit, used for transmitting the rotating force of the drive means (A") to the screw feeders 40 and 40', forms a gear transmission system. However, it should be understood that another type of conventional power transmission system, such as a belt or chain transmission system, may be used in place of the gear transmission system without affecting the functioning of this invention.

Figure 7A:
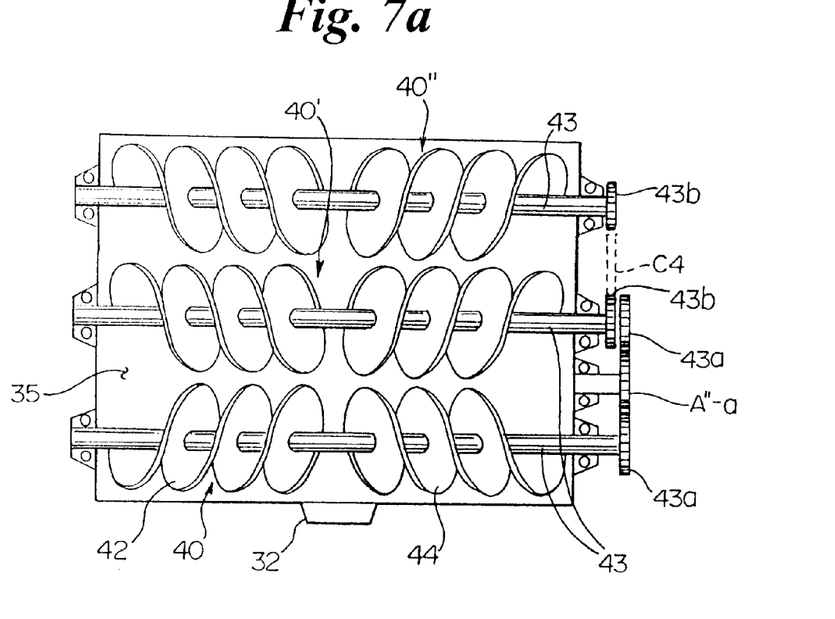
FIGS. 7a and 7b are views showing the construction and operation of a mixing/crushing unit installed in the device of FIG. 5, the unit consisting of three mixing/crushing screw feeders in accordance with another embodiment of this invention.
Figure 7B:
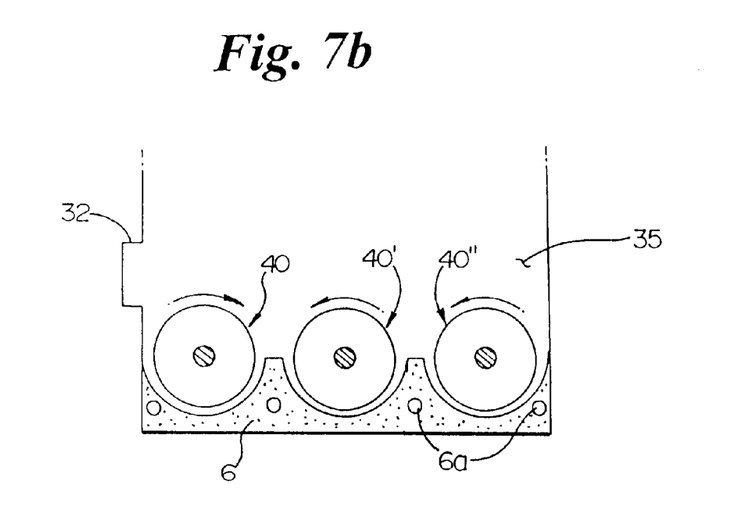

In the above device, the number of screw feeders may be changed in order to meet the amount of edible waste material to be processed by the device. That is, three screw feeders 40, 40' and 40" may be horizontally and parallely arranged inside the chamber 35 as shown in FIGS. 7a and 7b. As shown in the drawings, the additional screw feeder or the third screw feeder 40" is arranged aside by the second screw feeder 40' at a position opposite to the first screw feeder 40. That is, the first and third screw feeders 40 and 40" are parallely positioned at both sides of the second screw feeder 40'. The rotational direction of the helical screws upon the drive shaft of the third screw feeder 40" remains the same as that of the second screw feeder 40'. In the embodiment of FIGS. 7a and 7b, the power transmission unit for the three screw feeders 40, 40' and 40" has two end sprockets 43b in addition to the construction described for the embodiment of FIGS. 6a and 6b. The two end sprockets 43b are individually mounted to the end of the rotating shaft 43 of each of the second and third screw feeders 40' and 40". The two sprockets 43b are also connected to each other through a fourth chain C4 so as to rotate the two screw feeders 40' and 40" in the same direction.

In the drawings, the reference numeral 6a denotes a heating pipe, which is arrayed in the insulating material 6, thus allowing hot air from a hot air source (not shown) to circulate throughout the heating material 6. The numerals 34 and 32 denote an entrance and an exit, both being provided at the chamber 35 so as to inlet and discharge waste material into and from the chamber 35, respectively. The numerals 37 and 38 denote an air intake port and an air suction port for the chamber 35, respectively. The numeral 9 denotes a blower fan which forcibly circulates air inside the chamber 5 in a direction from the air intake port 7 to the air suction port 8.

The operational effect of the above device of FIGS. 5 to 6b will be described hereinbelow.

In order to produce feed stuff or organic fertilizer from edible waste material by fermenting and drying the material using the above device, an appropriate a mount of waste material, such as domestic and commercial food waste products in addition to marine, livestock and agriculture by-products resulting from the commercial production of food items, is introduced into the fermenting/drying chamber 35 through the entrance 34.

Thereafter, the blower fan 39 is activated, thereby forcibly circulating air within the chamber 35 in a direction from the air intake port 37 to the air suction port 38.

In addition, the hot air source is activated in order to increase the temperature of the chamber 35. That is, when the hot air source is activated, hot air from the source circulates through the heating pipe 6a, thus increasing the temperature of the chamber 35 to a level suitable for naturally fermenting and drying the waste material in the chamber 35.

Thereafter, the drive means A" for the screw feeders 40 and 40' are activated, thus starting the two screw feeders 40 and 40'. In such a case, the two screw feeders 40 and 40' are rotated in opposite directions.

As described above, the two screw feeders 40 and 40', used for mixing and crushing edible waste material, individually comprise a drive shaft 43 with two helical screws 42 and 44 rotating upon the drive shaft 43 in opposite directions at both sides of the shaft 43. Therefore, the waste material in the chamber 35 moves along the two screw feeders 40 and 40' from the outside to the center while being mixed and crushed by the helical screws of the screw feeders 40 and 40'. Thereafter, the waste material moves along the two screw feeders 40 and 40' from the center to the outside while being mixed and crushed. Such an opposite directional movement of the waste material along the screw feeders 40 and 40' is repeated until the waste material is completely fermented and dried into feed stuff or organic fertilizer.

In such a case, the two screw feeders 40 and 40' are rotated in opposite directions, thus effectively mixing and crushing the waste material while moving it. Therefore, the above device naturally ferments and dries the waste material into feed stuff or organic fertilizer at low temperatures.

During the operation of the device, the two screw feeders 40 and 40' are rotated in opposite directions by the drive means A", so that the waste material comes into frictional contact with the screw feeders 40 and 40', thus generating low temperature heat. Such low temperature heat not only forms a desirable condition suitable for naturally fermenting and drying the waste material, but also sterilizes the waste material.

In addition, the waste material is effectively and uniformly mixed and crushed by the screw feeders 40 and 40', so that the natural fermentation and drying effect of the device is not partially affected on the waste material, but is uniformly affected on all the waste material.

When the waste material in the chamber 35 is completely processed into feed stuff or organic fertilizer by the device, the feed stuff or organic fertilizer is discharged to the outside of the chamber 35 through the exit 32.

On the other hand, the device of FIGS. 7a and 7b is operated as follows. That is, when the device is started, the first and second screw feeders 40 and 40' are rotated in opposite directions, while the third screw feeder 40" is rotated in the same direction as that of the second screw feeder 40'. During the operation of the above device, edible waste material in the chamber 35 moves along the first and second screw feeders 40 and 40' while being mixed and crushed by the helical screws of the two feeders 40 and 40' in the same manner as that described for the embodiment of FIGS. 6a and 6b. In the device of FIGS. 7a and 7b, the waste material also moves along the third screw feeder 40", so that the device more effectively and uniformly mixes and crushes the waste material in comparison with the device of FIGS. 6a and 6b. Therefore, the device of FIGS. 7a and 7b improves the natural fermentation and drying effect for the waste material. Of course, both the number and rotating direction of the screw feeders of the above device may be changed without affecting the functioning of this invention.

As described above, the present invention provides a method and device for naturally fermenting, drying and sterilizing edible waste material, consisting of domestic and commercial food waste products in addition to marine, livestock and agriculture by-products resulting from the commercial production of food items, at low temperatures while uniformly and effectively mixing and crushing the waste material, thus producing high quality feed stuff or organic fertilizer from such waste material.

The device of this invention uniformly distributes edible waste material in a fermenting/drying chamber without allowing the heavy and bulky waste material to be partially overloaded on a mixing/crushing means inside the chamber. The device is thus effectively used for a lengthy period of time while being economical in the consumption of electricity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for producing feed stuff or organic fertilizer from edible waster material, consisting of domestic and commercial food waste products in addition to marine, livestock and agriculture by-products resulting from the commercial production of food items, through a low temperature, natural fermentation and drying process in a fermentation/drying chamber, comprising:

two mixing/crushing units inclined, with respect to a horizontal plane, in said chamber with inclining directions of said two units being opposite each other, each of said two units comprising alternately and parallely arranged first and second screw feeders rotatable in opposite directions to move the waste material upwardly while mixing and crushing the material; and two mixing units, each having an inclined end and a declined end, each said mixing unit having its inclined end overlapping an inclined end with respect to said horizontal plane of one of said mixing/crushing units and having said declined end underlapping a declined end of one of said mixing/crushing units, each of said mixing units comprising two screw feeders rotatable in the same direction, thus moving the waste material downwardly while mixing the material prior to passing the material to the declined ends of the mixing/crushing units.

2. The device according to claim 1, wherein one of the two mixing units extends to an exit of the chamber, thereby selectively discharging processed waste material to the outside of said chamber through the exit by rotating the screw feeders of said mixing units, extending to said exit, in a reversed direction.

* * * * *